May 30, 1944.   P. R. LUERTZING   2,350,052
METHOD OF MAKING HOLLOW GLASS ARTICLES
Filed Aug. 23, 1940   2 Sheets-Sheet 1
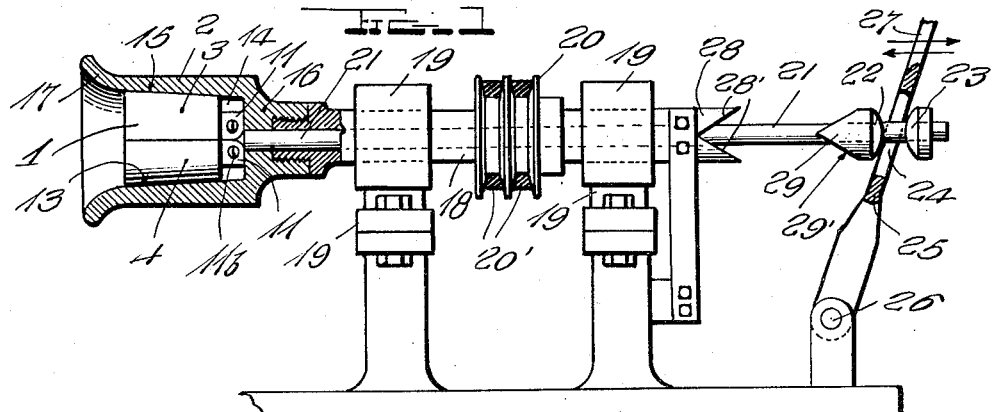
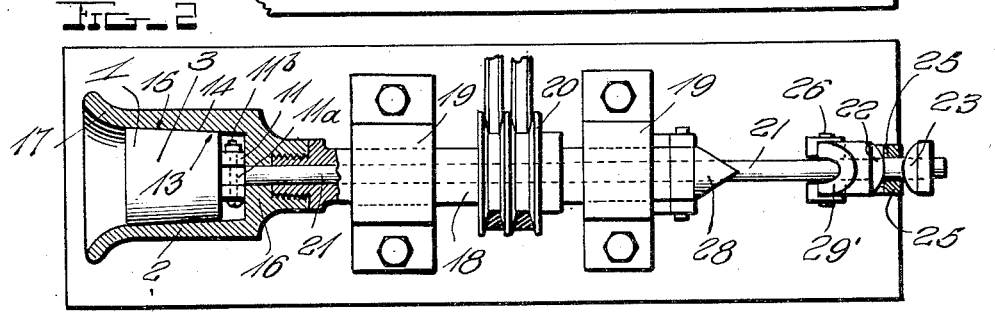
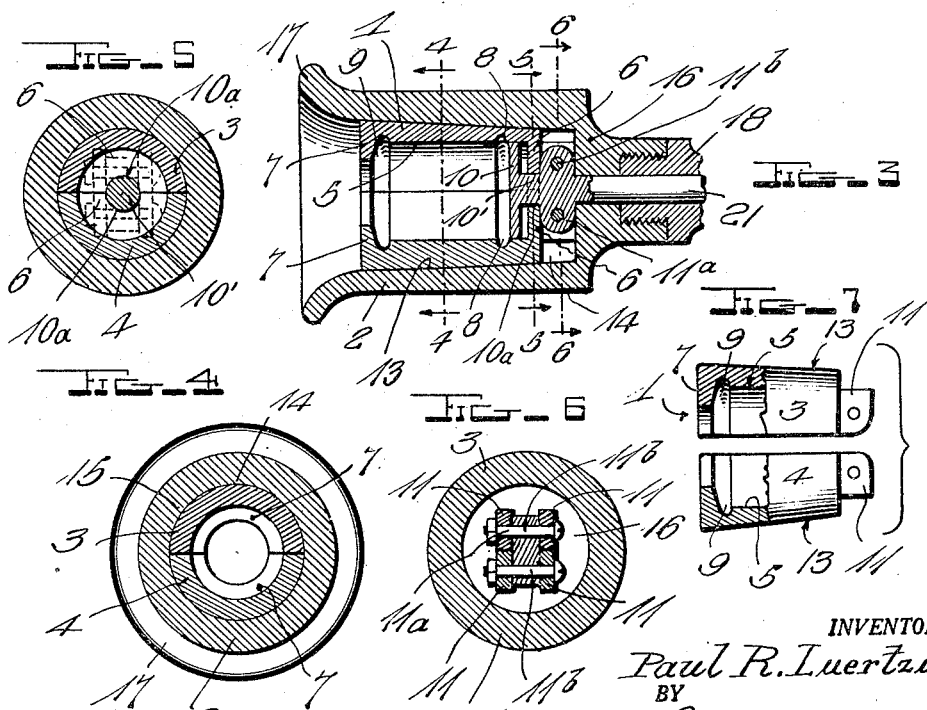
INVENTOR:
Paul R. Luertzing,
BY
Ross J. Woodward,
Attorney.

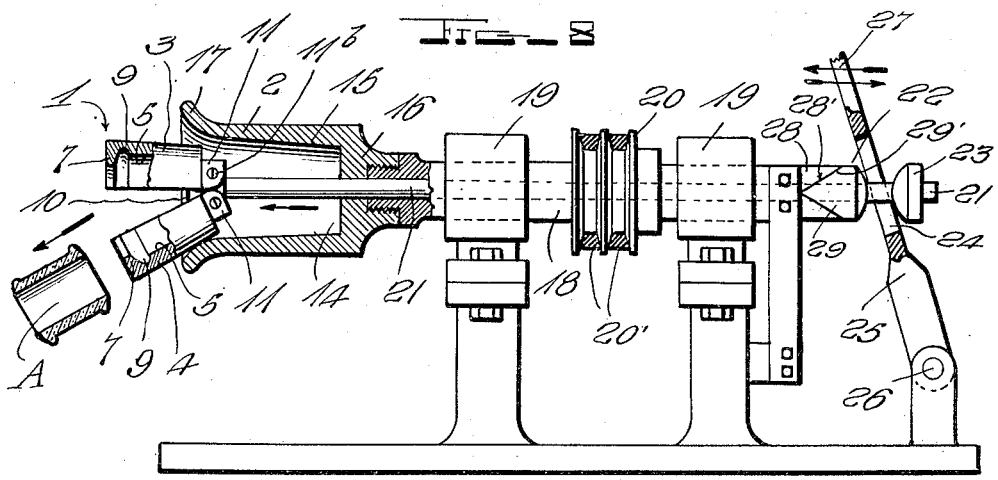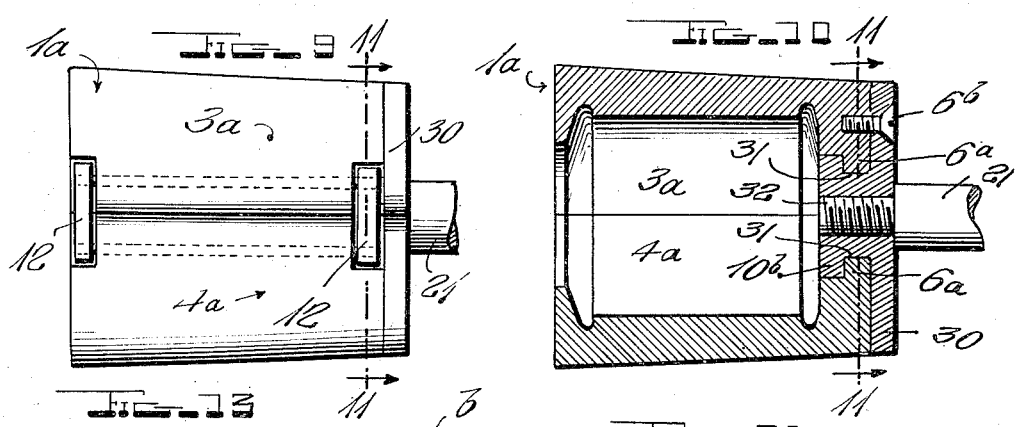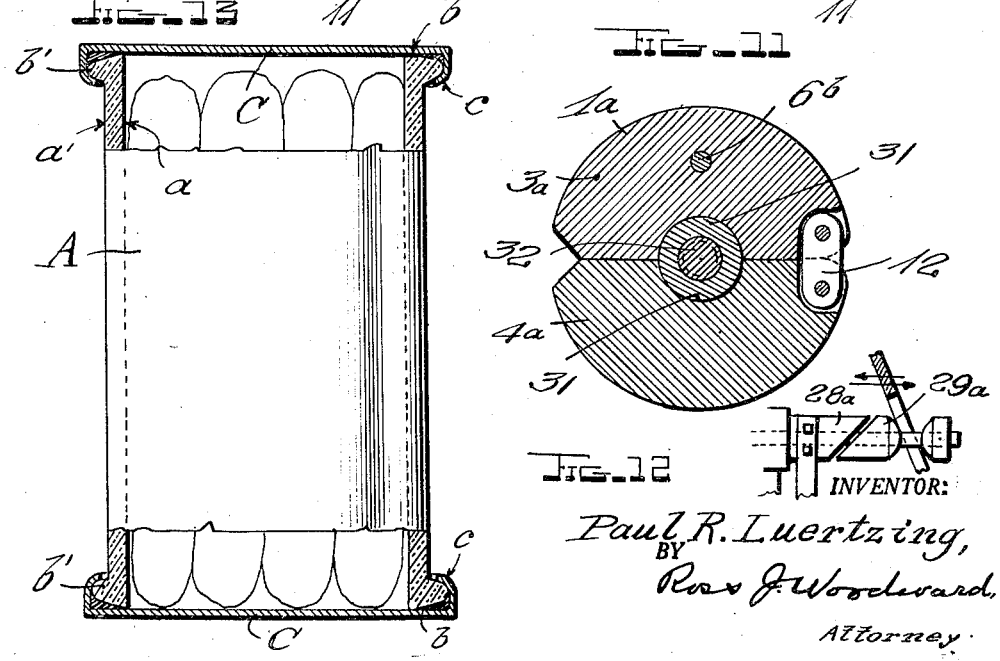

Patented May 30, 1944

2,350,052

UNITED STATES PATENT OFFICE 2,350,052

METHOD OF MAKING HOLLOW GLASS ARTICLES

Paul R. Luertzing, Vineland, N. J., assignor of one-half to Walter O. Luertzing, Vineland, N. J.

Application August 23, 1940, Serial No. 353,952

5 Claims. (Cl. 49—85)

This invention relates to the manufacture of hollow glass articles, and particularly to the manufacture in a single operation of a tubular or cylindrical container body which is open at both ends and of uniform internal diameter throughout its length and of a desired external configuration or provided with any desired external projections. More particularly the invention relates to the manufacture of a container body complete with finished ends preferably shaped to have heads or closures applied thereto and firmly secured in sealing engagement therewith.

Attempts have previously been made to form such articles, but they have not been commercially successful, as complicated and expensive machinery was necessary in their production, and/or it was necessary to first form a blank or partially formed or unfinished article and then subject the blank or unfinished article to other forming or finishing operations in order to complete the manufacture of the article.

One object of the present invention is to provide a novel and improved method whereby a tubular or cylindrical article of this character, with finished ends and ready for intended use may be easily and quickly formed in a single operation, and without the necessity of carrying out additional forming operations, thus reducing the cost of manufacture so that such container bodies or other similar hollow glass article may be manufactured at a cost which is commercially practical.

Another object of the invention is to provide a commercially practicable and successful method whereby formation of a cylindrical glass body ready for use may be effected through the medium of centrifugal force created in a rotary mold acting as a single forming means and without the use of other auxiliary forming means or elements to produce the completed article.

Still another object of the invention is to provide a method whereby a hollow glass article, such as a cylindrical container body open at both ends, of a uniform internal diameter throughout its length, and having a smooth inner surface and an outer surface of any desired external form or configuration conforming to the internal shape of the mold in which it is made, may be produced in a highly rapid and commercially successful manner and released, without injury or necessity of subsequent finishing, from the mold.

Still another object of the invention is to provide a method of manufacturing an article of this character in which the forming surface of the mold, speed of rotation of the mold and centrifugal force employed are so co-related and cooperate as to secure a rapid flow of the hot glass against the forming surfaces of the mold to prevent undesired cooling of the glass and thereby to enable in a single operation a perfect article to be produced which is free from structural or appearance flaws due to early cooling and resulting skin effects, improper flow of glass or other causes.

Still another object of the invention is to provide a method of making by centrifugal force a hollow glass article of the character described in an openable and closable mold having a forming surface allowing an article of any desired external configuration or with external projections to be formed, wherein the action of centrifugal force is also utilized in conjunction with a tapered holder or binder as an agent in holding the mold closed, and whereby the steps of manufacture and discharge of the article from the mold are such as to prevent liability of injury to the article which might otherwise result through any degree of opening movement of the mold before the article is completely formed or cooled to a sufficient extent to allow its safe removal.

Still another object of the invention is to provide a method of manufacture of hollow glass articles of the type described in a rotary mold of such form and operated at such speed and under such a degree of centrifugal force as to ensure the production in a rapid manner of finished articles free from structural or surface flaws.

Still another object of the invention is to provide a method of this character whereby hollow glass articles of uniform wall thickness may be molded without the necessity of preliminarily shaping a glass charge, without the necessity of maintaining accurate control of the viscosity or temperature of the charge, as the viscosity and temperature of the glass may vary without detriment within certain limits, and without the use of any other means within or in conjunction with the mold to shape or direct the flow of glass in the forming operation, and whereby such articles after being formed may be released from the mold without injury or deformation.

In the accompanying drawings showing for purposes of exemplification a preferred type of apparatus for carrying the invention into practical effect, which apparatus is set forth and claimed in my copending application, Serial No. 353,951, filed of even date herewith.

Fig. 1 is a side elevation of the apparatus with the mold and holder shown in section and the mold drawn into the holder for an article forming action.

Fig. 2 is a top plan view of the same.

Fig. 3 is a sectional view of the mold and holder on an enlarged scale.

Figs. 4, 5 and 6 are cross-sections on the lines 4—4, 5—5 and 6—6 of Fig. 3.

Fig. 7 is a view, partly in side elevation and partly in section, of the sections of the mold detached from the shifter rod.

Fig. 8 is a view similar to Fig. 1 of the apparatus showing the mold freed from the holder and opened to eject a formed article.

Fig. 9 is a view in side elevation of a modified form of mold.

Fig. 10 is a longitudinal section of the same.

Fig. 11 is a cross-section on line 11—11 of Figs. 9 and 10.

Fig. 12 shows the cams used in the modified construction.

Fig. 13 is a view of one form of hollow glass article which may be made by the improved process, namely, a container body having sealing closures applied thereto.

In carrying my invention into practice I provide a closable and openable article forming rotary mold 1 which is adapted to be held in closed position while in operation within a mold holder or shell 2, which is rotatable in a forming operation in unison with the mold. These elements may be mounted for use in a vertical position or in a horizontal position or in any intermediate angular position. The mold and its holder are, however, preferably disposed for use in a horizontal position, as this position obviates the necessity of raising and lowering the mold for article forming and convenient article ejecting actions and avoids certain difficulties encountered in forming the article in a vertically disposed mold, and provides for the more ready ejection of the formed articles and their transfer to a lehr for annealing.

The mold 1 comprises a generally cylindrical body divided along a central longitudinal line to form two sections 3 and 4. These sections are interiorly shaped to form an annular article body forming surface 5. Located beyond the ends of this surface 5, and respectively at the top and bottom or inner and outer ends of the mold, are inwardly extending flanges 6 and 7 which reduce the diameter of the mold chamber at these points. The inner surface of the flange 7, as shown, is continuous with the outer side of the groove 9 and said flange 8 extends inwardly beyond the forming surface 5 sufficiently to serve as a stop to limit and arrest the outward longitudinal flow of the glass and to deflect and direct the glass laterally into said groove. Additionally the inner surface of the flange 7 also forms a mold surface to give a desired form and finish to the outer end of the article being formed. Between these flanges and the respective ends of the surface 5 are grooves 8 and 9, the walls of the grooves and adjacent or inner faces of the flanges coacting to form article end finishing and shaping surfaces. A head or abutment plate 10 is arranged to peripherally bear on the inner faces of the mold sections when the mold sections are closed and so as to form a seal to tightly close the bottom of the mold adjacent the inner side of the groove to prevent escape of glass at this point beyond the groove and to arrest the longitudinal flow of the glass at the inner end of the groove and deflect or direct the glass laterally into said groove. This plate also serves as a mold surface to give a desired form and finish to the inner end of the article being formed and has a rearwardly extending shank or stem 10' which is adapted to pass through and to be received in recesses 10a formed in the flanges 6, whereby the flanges are adapted to close snugly about said shank or stem. The flanges 6 are formed with perforated ears or hinge knuckles 11 and the shank or stem 10' with similar knuckles 11a for the passage of pivot pins 11b whereby the mold sections are pivotally connected at their inner ends to the head 10 and to each other for radial swinging movements adapting the mold to be closed for use and opened for ejection of the formed article. The shank or stem 10' also serves to connect the mold to a shifter whereby it is adapted to be held in working position and to be shifted for opening and closing movements, as hereinafter described.

The mold 1 is fitted in the holder 2 for rotation therewith in an article forming operation and to slide longitudinally therein for closing and opening actions. To this end the outer surface 13 of the mold is longitudinally tapered and the holder 2 is provided with a chamber 14 to conformably receive the mold, the annular body wall of which has its inner surface 15 correspondingly tapered. The tapered surfaces 13 and 15 act not only as clutch surfaces to connect the mold and holder for rotation in unison, but also as variable binding surfaces to hold the mold from longitudinal movement and keep it closed in any of its seating positions in the holder and adapt the latter to act as a restrainer to prevent spreading of the mold sections under centrifugal force in the rotation of the mold and holder. The chamber 14 is closed at its inner end by a head 16 but normally open at its outer end to allow inward and outward movements of the mold, and said chamber and its tapered surface are of greater length than the mold to adapt the mold to be drawn inward to greater or less degrees and to be fully enclosed by the holder and held by the tapered surfaces in any of its inwardly drawn or seating positions. At its outer end the holder is annularly enlarged or provided with a flaring or bell-mouthed portion 17 adapted to accurately guide the mold into the holder and to permit the mold sections to swing open as soon as the inner end of the mold is forced outwardly in an article removing action beyond the open end of the holder, but not before. By this means the mold is adapted to be seated fully, and tightly at all times into the holder regardless of the different degrees of expansion to which the mold and holder are subjected by heat in the molding operations and the mold is also adapted to be held closed against any tendency of its sections to spread under centrifugal force.

The mechanism for rotating the mold and holder and sliding the mold into and out of the holder may be of any preferred construction. In the construction shown, however, the holder is mounted at its closed end on a hollow horizontal shaft 18 journaled in suitable bearing supports 19 and carrying a double pulley 20 driven by drive belts 20' from an electric or other suitable motor (not shown) capable of driving the mold and holder at a very high rate of speed. Suitable speed gearing may be used in the driven connection if and when required in order to obtain the desired high speed. Also any suitable type of brake mechanism may be used to quickly stop the rotation of the mold and holder at the end of each article forming action. Extending through the shaft 18 is a shifter rod 21 which projects at its forward end into the inner end of the mold holder, coaxially therewith and is integral with or suitably fixed to the shank or stem 10' of the head 10 whereby the rod is connected to the mold sections for shifting the same longitudinally in the holder. This rod is rotatable with the mold and holder in a molding operation and is adapted to be shifted longitudinally in one direction or the other when the mold and holder are at rest to draw the mold into the holder and close it or force it out of the holder and open it. The opposite end of the rod has fixed thereto a pair of spaced abutments 22 and 23 and the portion of the rod therebetween passes through an opening 24 in an operating lever 25 pivoted at one end on one side of the rod, as at 26, and having an operating end or arm 27 extending beyond the opposite side of the rod. This lever may be moved rearwardly to transmit movement through the abutment 23 to draw the open mold from ejecting position into the holder and may be moved forwardly to transmit movement through the abutment 22 to force the enclosed mold outwardly from the holder so that its sections will open for the ejection of the formed article. When the parts are in position for a molding operation the rod 21 will rotate freely in the opening but will be held fixed in such position against rotation or forward movement during the molding period by the binding action of the mold against the holder, or it may be held fixed by manually holding or suitably fastening the lever 25 in its retracted position.

It is desirable to provide some means to ensure the accurate positioning of the mold for an opening and article discharge action when, at the end of an article forming operation, it is brought to a state of rest and so that one of its sections will be disposed to drop downward to open the mold for the discharge or removal of the formed article. To this end a stationary rod turning member or cam having an annular series of prongs or projections 28 provided with inclined or cam faces 28' is provided upon one of the bearing supports 19 for cooperation with a rod turning member or cam integral with the abutment 22 and having similar prongs or projections 29 provided with inclined or cam faces 29'. These cams or rod turning members are so arranged that when the lever 25 is moved to shift the rod forwardly for a mold opening action, the cam surfaces of the members will be brought into engagement at the moment of release of the mold from the holder, so that if the mold is not disposed with one of its sections in position to drop down the rod will be rotated to turn it to such position. The cams or rod turning members when so engaged will also provide a lock to hold the mold in its discharge position. When the mold is closed for the forming operation within the holder 2 the meeting edges of the mold sections are forced tightly together to seal the mold against the passage of glass at such points and prevent the formation of fins at the similar sides of the formed article. The closing of the mold sections together also causes a tight engagement of the mold walls with the periphery of the head 10 in line with the inner side of the groove 8, so that the head 10 seals the bottom of the mold against any escape of glass between the mold and head 10 and prevents the formation of a fin or other excrescence upon the adjacent end of the formed article. As shown, the flanges 7 at the outer ends of the mold sections extend radially inward beyond the article body forming surfaces of the mold sections so as to reduce the diameter of the mouth of the closed mold and form a mouth of a diameter sufficient to allow of the free introduction of a charge of glass and inflow and outflow of air during the forming operation, but insufficient to allow of the discharge of glass by centrifugal force in the forming operation. Thus even if the charge should be somewhat excessive in amount no discharge of glass through the mouth will occur, the outward flow of the glass being limited and arrested by the flange 7 and the excess glass being uniformly distributed over the forming surface 5. By this means an article of somewhat greater wall thickness than intended and within permissible limits will be produced, but the formed outer end of such article will be free from fins which would otherwise be formed thereon if any portion of the glass were permitted to pass into or outward through the mold mouth. The above described construction also adapts the head 10 and flange 7, which are fixed with relation to each other against movement longitudinally of the mold, to serve as article end forming and finishing surfaces and as deflectors to direct the glass laterally into the grooves 8 and 9, which in coaction with the head 10 and flange 7 give the desired shape and finish to the ends of the article. As the mold is held during rotation tightly clamped within the comparatively heavy holder or binder 2, it may be rotated at very high speeds to produce any centrifugal force desired without causing either body vibration of the mold or vibration of its walls liable to cause irregular distribution of the glass and the production of a faulty article. A particular advantage of this construction of mold, also, is that it allows formation of the article in a horizontal position without difficulty in feeding it with charges or liability of escape of glass, and with a saving of time over that of a vertically arranged mold in effecting the discharge of the formed article, while obviating the necessity of using an injector for discharging the article itself from the mold.

In Figs. 9, 10, 11 and 12 I have shown a modified form of mold 1a in which the mold is also divided longitudinally into two sections 3a and 4a, but in this construction the mold sections instead of being pivotally connected at their inner ends to the mold bottom plate or shifter rod head are hingedly connected, as at 12, at one side to each other and are formed separate from the rod or head but the upper one is fixed thereto by a suitable number of screws 6b. As shown, the inner ends of the molds are formed with inturned flanges 6a adapted to fit in an annular space or groove between a head or bottom plate 10b and a back plate 30 and having their abutting edges formed with semi-circular recesses 31 to receive and snugly fit about a shank or stem 32, which rigidly connects the head and plate, when the mold sections are closed. The head 10b, plate 30 and shank 31 are formed with a threaded bore to receive the forward threaded end of the shifter rod 21 or are otherwise connected thereto to couple the mold sections for shifting movements to the shifter rod. The cams or stops 28a and 29a in this construction are formed as shown in Fig. 12 so that when the mold is stopped at the end of a molding operation and brought into proper ejecting position by the cams 28a and 29a the mold section 4a will always underlie the mold section 3a so that it may drop down to ejecting position on the hinge connections 12. The upper mold section will in this ejecting position be held in engagement with the rod 21 by its engagement with the head 105 and back plate 30. This mold is otherwise of the same construction as the mold 1 and operates in like manner.

In the operation of the apparatus for the carrying out of the method of manufacture, the mold, if not disposed within its holder, is drawn into the holder by a proper retracting movement of the shifter rod 21, whereby it is clutched to the holder for rotation therewith and held in closed position. The holder and mold are then rotated at very high speed and a charge of glass of a proper amount and temperature is then suitably fed into the mold. While it has been stated that the mold and the holder are rotating when the glass is fed into the mold, it will be understood that the glass may be fed into the mold before the mold and the holder are set in motion. The mold and holder are driven at such high speed as to produce a centrifugal force of such a degree as to cause the glass to spread and flow longitudinally and circumferentially over the forming surfaces on which it will be properly deposited to form an article of the character described, that is, a tubular or cylindrical body, open at each end and of uniform diameter from end to end thereof, which body is provided with finished end surfaces shaped, if desired, to produce upon its end surfaces external beads or other projections. The walls of this body, except where provided with external projections, will be of uniform thickness. The rotation of the mold at the desired high speed effects the distribution of the glass and formation of the article in a finished shape and ready for its intended use within a few seconds or very small period of time. At the end of this forming period the rotary motion of the mold and its holder is arrested and the mold and holder brought to a stop, whereupon the lever 25 is operated to shift the rod 21 forwardly to displace the mold from the holder. During this shifting movement, and at all times until the rear end of the mold comes into engagement with the flaring outer end of the holder, the mold is held securely closed and against any liability of accidental opening causing injury to or deformation of the formed article. At about the time the mold clears its holder, the cam surfaces 29' of cam member 29 come into engagement with the cam surfaces 28' of cam member 28 and rotate the rod 21 to bring the mold into proper position, if not in such position, for the disposal of its sections so that one of the sections will drop down by gravity and allow ejection or removal of the article. After the mold has been in operation for some time and the mold and its holder becomes highly heated and expanded to different degrees at different high temperatures, the mold seats to a greater or less depth in its receiving chamber in the holder, which compensating action is allowed by the slight taper of the tapered clutch surfaces of the mold and holder, so that a tight engagement between the mold and holder to fully close the mold and keep it closed for a forming action will be obtained, but the length of the holder chamber insures at all times the drawing of the mold into the chamber to a sufficient degree to close it and to keep it closed against opening or outward longitudinal movement under the action of the centrifugal force. By this means a simple and effective construction is provided to compensate for temperature changes and expansion and contraction of the holder and to secure a positive closing of the enclosed mold and maintenance of the mold in closed position until it is fully displaced from the holder for an article ejecting action. It will be understood that in the forming operation above described the glass flowing longitudinally of and around the mold surface will be checked in its longitudinal flow as it strikes the inner surfaces of the flange 7 and sealing head 10 and will thereby be prevented from escaping outward into or escaping through the mold mouth or passing inwardly beyond the groove 8 and between the periphery of the head 10 and portions of the mold with which it contacts. By this means the loss of glass through the mold mouth or formation of fins or other excrescences upon the ends of the article will be avoided. The glass striking the inner surfaces of the flange 7 and head 10 will thus be confined in the mold between the flange 7 and head 10 which will deflect the glass into the grooves 8 and 9 and form the ends of the article with external projections having completely finished surfaces.

The apparatus may be employed for manufacturing tubular or cylindrical articles of uniform internal diameter and smooth internal finish from end to end thereof and provided with plain finished ends or with finished ends of a type having external beads, threads or other projections for use in connection with closure members adapted for tight sealing engagement with the beads, threads or other projections to close the ends of the container. In practice, the article body forming surface of the mold may be shaped to produce an article which is externally of true cylindrical shape or of any other desired external shape and which is formed or not with letters, figures, monograms, trademarks or other ornamental matter molded integrally therewith. Where an article of truly cylindrical shape, both internally and externally is produced, the article will be of equal wall thickness throughout and provided with smooth, finished internal and external surfaces.

In Fig. 13 I have shown a type of article which the apparatus as specifically disclosed herein is designed to produce. This comprises a tubular or cylindrical container body A, having an internal surface $a$ of uniform diameter from end to end, a cylindrical outer surface $a'$, both of which surfaces are smooth surfaced, and finished end portions $b$ provided with external annular beads $b'$ for the engagement therewith of the hooked or flanged edges $c$ of sealing closures or caps C, whose flanges are adapted to be crimped over and interlocked with the beads to firmly secure the sealing closures in position. Container bodies of this type may be used for the putting up of fruits, vegetables, jellies, preserves and other commodities which may be conveniently packed in this manner for sale and so as to produce an attractive form of package through which the packed commodity will show so as to give an attractive display. Similarly, the container body may be formed, in place of beads, with threads or cam or other projections for the engagement therewith of seals or closures suitably constructed to engage the threads or projections. While, as stated, the mold may be operated in a vertical position, a horizontal position, or any intermediate position, I preferably operate the mold in a horizontal position or in a substantially horizontal position, that is, at a slight upward angle to the horizontal, as in this position the mold may be operated with greater facility and with the advantage of producing uniformly better articles and with less liability of producing faulty articles, or of formed articles cracking in the mold, than if the mold were operated in a vertical position or at an angle approaching the vertical. A long and extensive course of experimentation has shown that this is true in spinning all cylindrical glass articles, as speed in forming the article from the molten glass and in discharging the article from the mold is essential in order to produce an unblemished article and to prevent cracking of the article in the mold before it can be discharged. This is due to the fact that any retardation of the flow of glass while the glass mass as a whole is in contact with a portion of the mold wall causes, by chilling and setting of the glass, a skin formation which, besides interfering with the free and unrestricted flow of the glass and the production of an article of proper wall thickness, shows as a flaw or blemish in the finished article, and also the fact that the difference in expansion and contraction between the metallic mold and the glass is so great that it is liable to result in the cracking of the formed article if not removed at once from the mold. After the article has been formed it quickly chills and sets and, at the same time, the mold cools and begins to contract inward considerably more than the glass and consequently results in cracking the finished article unless quickly removed. It is, therefore, important to distribute the glass from the time of deposit rapidly over the forming surface for the production of the article and to discharge the article as quickly as possible from the mold. If the mold is used in a vertical position, the glass charge supplied, whether the mold is at rest or spinning, will fall in a mass to the bottom of the mold. Even if the mold is then operated at high spinning speed, the inertia of the mass of glass and the force of gravity must be overcome before the glass begins to climb and to be spread. Contact of the glass with the bottom of the mold under these conditions causes chilling and setting of the glass to a degree which increases the resistance to the free flow of the glass and is also liable to cause the formation of a solid skin at the contact point which shows as a blemish in the formed article. The resistance to the flow of glass, furthermore, tends to prevent equal distribution and to form an article which is not of equal wall thickness. Some time is also required to permit extraction of the article from the vertically disposed mold, as the mold must be opened and the article physically extracted, with liability of damage thereto, or the mold must be turned down to a horizontal position for discharge of the article, requiring a period of time in either case during which the article is liable to crack owing to the more rapid cooling of the mold. These objections are avoided by the operation of the mold in a horizontal position or substantially horizontal position, which allows an elongated charge of molten glass equal in volume to the article to be produced to be fed through the open end or mouth of the mold into the mold and deposited on the article body forming surface 5 of the mold at some intermediate point in its length while the mold is stationary or substantially so, i. e., slowly rotating, so that by rapidly accelerating the rotation of the mold to a high speed to effect the spinning operation, the glass will be spread uniformly in all directions in the length of the mold, which reduces the time period of distribution to such an extent as to avoid skin formation and restriction to the flow of glass. With the mold in a horizontal position, or substantially horizontal position, the time period for the discharge of the article is also reduced so that it may be removed before liability of cracking, due to rapid temperature changes between the mold and article occurring, as when the article is completed it may be discharged by simply moving the mold out of the holder to discharging position, in which it operates to automatically discharge the article, which is facilitated by my construction and arrangement of mold.

It is the general custom to make glass article forming molds of cast metal or other metals which, as a result of their composition, have minute pits, sand holes or other crevices, flaws or imperfections in their forming surfaces, and which are generally not found objectionable or faulty for use in ordinary glass molding operations because of the low glass forming pressures employed. I, however, form my improved mold, and also preferably its holder, of a hard, high heat and high temperature resisting metal, such as stainless steel, that is, a metal which may be machine finished to make the tapered engaging surfaces smooth and true fitting and particularly for the purpose of enabling the forming surfaces of the mold to be machine finished to a highly polished condition. By this means a mold surface is produced which is free from pits or other surface imperfections into which the glass may be forced under the high centrifugal pressure set up in the operation of the mold, thereby interfering with the free flow of the glass and causing imperfections in the external surface of the formed article giving it an undesirable rough, unfinished or frosted appearance. Furthermore, by providing the mold with a smooth highly polished surface, a material and important advantage is gained in a centrifugal molding action, in that, in addition to the smooth surface imparted to the glass, the glass may flow with less resistance and greater speed over the forming surfaces, the speed of flow being the result of the amount of centrifugal force used plus the reduction of resistance due to the use of the polished surface. The resultant increased speed of action ensures the entire deposit of glass and formation of articles within such a small time period that chilling of the glass to an extent to cause imperfections due to skin effects will be avoided, and an article free from imperfections and uniformly clear and of high transparency produced. By using glass charges of a suitably high temperature, an additional advantage may be gained by this rate of flow in that the high initial heat of the glass, largely retained instead of being dissipated to a material degree, tends to give the article a highly smooth and polished effect similar to that produced by fire polishing. It is to be understood, however, that I may use a hard metal mold having a polished forming surface purposely formed with pits or indentations when it is desired to manufacture glass bodies having frosted surfaces.

As a result of the method of manufacture herein described I am able to produce, within a minimum period of time for each forming action, hollow glass articles of the character set forth for the purposes described and other purposes which are transparent, free from structural flaws and surface imperfections, transparent to a high degree and of a highly smooth and polished appearance. Each article may be made in a single operation complete in itself as intended for use, and without the necessity of carrying out any completing or finishing operations whatever. Such articles may be made without the necessity of pre-forming a glass charge, pressing, blowing or subjecting it to a vacuum operation in the mold or otherwise holding it in the mold or shaping it except by the single action of centrifugal force, and without special regard to the temperature and viscosity of the glass charge, within reasonable limits. By the use of a type of mold and holder of the character disclosed, the forming operation at very high speed and under high centrifugal force may be carried out without liability of the opening of the mold to any degree during the formation of the article, so that perfect articles will be produced. By the use of a hard metal mold having a highly polished forming surface and operated at a sufficiently high speed to produce a centrifugal force acting to cause the flow of glass with minimum resistance along and its deposit upon the forming surface, the glass is flowed and deposited in such a short period of time, before cooling causes skin effects to take place, that defects due to undue cooling of the glass before formation of the article are entirely eliminated.

While the steps of the method and mold structures herein disclosed are preferred for carrying the method into practical effect, it is to be understood that these may be changed or modified within the scope of the appended claims without departing from the spirit or sacrificing any of the advantages of the invention.

What I claim is:

1. The method of making an open ended tubular glass body with finished end surfaces in a single operation, which consists of feeding to a substantially horizontally disposed substantially stationary mold an elongated molten glass charge of a volume equal to that of the completed body, depositing the charge on the internal surface of the mold, and rapidly accelerating rotation of the mold about a substantially horizontal axis to cause by centrifugal force alone the flow of glass along its interior forming surface to complete the body.

2. The method of making an open ended tubular glass article with finished end surfaces in a single operation, which consists of feeding to a substantially horizontally disposed substantially stationary mold having an internal annular article body forming surface and article end forming and finishing surfaces at the ends thereof an elongated molten glass charge of a volume equal to that of the completed body, depositing the charge on the article body forming surface of the mold at some point in its length between the article end forming surfaces, and rapidly accelerating rotation of the mold about a substantially horizontal axis to cause by centrifugal force alone the flow of glass along its interior forming surfaces to complete the article.

3. The method of making an open ended tubular glass article with finished end surfaces in a single operation, which consists of feeding to a substantially horizontally disposed mold rotating at a slow rate of speed below spinning speed an elongated molten glass charge of a volume equal to that of the completed body, depositing the charge on the internal surface of the mold at some point in its length, and rapidly accelerating rotation of the mold about a substantially horizontal axis to a high spinning speed to cause by centrifugal force alone the flow of glass universally about and along its internal forming surface to complete the article.

4. The method of making an open ended tubular glass article with finished end surfaces in a single operation, which consists of feeding to a substantially horizontally disposed substantially stationary openable and closable mold having an internal forming surface an elongated molten glass charge of a volume equal to that of the completed article, depositing the charge on the internal surface of the closed mold at some point in its length, rapidly accelerating rotation of the mold about a substantially horizontal axis to a high rate of speed to cause by centrifugal force alone the flow of glass along its internal forming surface to complete the article, there being established a restraining force against vibration of the mold walls and the opening of the mold under centrifugal force during its rotation and while the article is being formed, and then removing the restraining force and opening the mold for the discharge of the formed article.

5. The method of making an open ended tubular glass body with finished end surfaces in a single operation, which consists of feeding to a substantially horizontally disposed substantially stationary hard, high heat resisting metal mold having a highly polished internal forming surface an elongated molten glass charge of a volume equal to that of the completed body, depositing the charge on the said polished forming surface of the mold at some point in its length, and rapidly accelerating rotation of the mold about a substantially horizontal axis to cause by centrifugal force alone the rapid flow of glass along its polished forming surface to complete the body.

PAUL R. LUERTZING.